(12) United States Patent
Kande et al.

(10) Patent No.: US 11,522,627 B2
(45) Date of Patent: Dec. 6, 2022

(54) TSN ENABLED CONTROLLER

(71) Applicant: ABB Schweiz AG, Baden (CH)

(72) Inventors: Mallikarjun Kande, Solon, OH (US);
David Mielnik, Painesville, OH (US);
Marco Sanguineti, Genoa (IT);
Thomas Heilman, Wickliffe, OH (US);
Mitchell Jordan Rackovan, Mentor, OH (US); Rahul Kumar Gore, Satara (IN); Ravish Kumar, Bangalore (IN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/418,287

(22) PCT Filed: Dec. 13, 2019

(86) PCT No.: PCT/IB2019/060742
§ 371 (c)(1),
(2) Date: Jun. 25, 2021

(87) PCT Pub. No.: WO2020/136487
PCT Pub. Date: Jul. 2, 2020

(65) Prior Publication Data
US 2022/0029724 A1 Jan. 27, 2022

(30) Foreign Application Priority Data
Dec. 26, 2018 (IN) .............................. 201841049073

(51) Int. Cl.
*H04L 47/2475* (2022.01)
*H04L 47/28* (2022.01)
(Continued)

(52) U.S. Cl.
CPC ........ *H04J 3/0667* (2013.01); *H04L 47/2475* (2013.01); *H04L 47/28* (2013.01); *H04L 67/125* (2013.01)

(58) Field of Classification Search
CPC ..... H04L 43/0852; H04L 47/24; H04L 69/22; H04L 1/1887; H04L 43/0858;
(Continued)

(56) References Cited

U.S. PATENT DOCUMENTS

2013/0041547 A1 2/2013 Goodermuth et al.
2014/0125498 A1 5/2014 Curry et al.
(Continued)

FOREIGN PATENT DOCUMENTS

WO 2018052605 A1 3/2018

OTHER PUBLICATIONS

M. Stanica et al., "Coexistence & Convergence in TSN-based Industrial Automation Networks," Jul. 24, 2018, 8 pages.
(Continued)

*Primary Examiner* — Djenane M Bayard
(74) *Attorney, Agent, or Firm* — Leydig, Voit & Mayer, Ltd.

(57) ABSTRACT

The present invention discloses a controller configured to communicate over a network in a process plant, wherein the network comprises one or more native TSN devices. The controller comprises one or more process applications for controlling one or more processes in the process plant, wherein the one or more process applications includes plurality of tags corresponding to one or more process variables of the one or more processes in the process plant, a software TSN agent for receiving and transmitting packets associated with the one or more process applications on the controller, wherein the software TSN agent is configured to segregate packets associated with the one or more process applications for processing the packets in at least one of a TSN communication mode and a non-TSN communication mode; and a first network interface dedicated for TSN
(Continued)

communication and a second network interface dedicated for non-TSN communication.

6 Claims, 3 Drawing Sheets

(51) Int. Cl.
*H04L 67/125* (2022.01)
*H04J 3/06* (2006.01)

(58) Field of Classification Search
CPC ......... H04L 47/28; H04L 47/34; H04L 67/12; H04L 1/1841; H04L 45/02; H04L 47/2441; H04L 47/805; H04L 1/0002; H04L 1/0054; H04L 1/08; H04L 1/1819; H04L 1/1822; H04L 1/20; H04L 1/205; H04L 12/4625; H04L 2025/03363; H04L 2025/0349; H04L 47/724; H04L 65/80; H04L 67/125; H04L 67/14; H04L 67/61; H04L 12/56; H04L 45/50; H04L 47/11; H04L 63/0428; H04L 63/0823; H04L 67/1046; H04L 67/34; H04L 67/62; H04L 1/1877; H04L 45/302; H04L 1/189; H04L 45/74591; H04L 47/2416; H04L 47/283; H04L 47/60; H04L 65/752; H04L 1/1838; H04L 1/187; H04L 41/0816; H04L 45/04; H04L 45/24; H04L 45/38; H04L 45/66; H04L 47/2433; H04L 47/31; H04L 47/50; H04L 47/521; H04L 47/522; H04L 47/6215; H04L 47/6275; H04L 47/781; H04L 49/254; H04L 49/351; H04L 49/90; H04L 1/0003; H04L 1/0009; H04L 1/0026; H04L 1/0061; H04L 1/18; H04L 1/1812; H04L 1/1848; H04L 1/188; H04L 1/22; H04L 12/40156; H04L 12/462; H04L 27/0002; H04L 47/15; H04L 47/225; H04L 47/2475; H04L 47/786; H04L 65/1069; H04L 1/0007; H04L 1/1835; H04L 1/1874; H04L 12/4641; H04L 12/5601; H04L 12/66; H04L 2012/5605; H04L 2012/561; H04L 2012/5652

See application file for complete search history.

(56) References Cited

U.S. PATENT DOCUMENTS

| | | |
|---|---|---|
| 2015/0375764 A1 | 12/2015 | Rajendran et al. |
| 2018/0006798 A1* | 1/2018 | Bilstad .................. H04J 3/0682 |
| 2018/0084055 A1* | 3/2018 | Mong .................. B61L 15/0072 |
| 2018/0212748 A1* | 7/2018 | Liu ...................... H04B 10/2507 |
| 2020/0036768 A1* | 1/2020 | Bedi ...................... H04L 65/602 |
| 2020/0120536 A1* | 4/2020 | Prakash ................ H04W 28/10 |

OTHER PUBLICATIONS

European Patent Office, International Search Report for PCT/IB2019/060742, dated Aug. 13, 2020, 7 pages.
European Patent Office, Written Opinion for PCT/IB2019/060742, dated Aug. 13, 2020, 7 pages.
Indian Patent Office, International Search Report for IN201841049073, Mar. 11, 2021, 6 pages.

* cited by examiner

TSN ENABLED CONTROLLER

CROSS REFERENCE TO RELATED APPLICATIONS

This application is a U.S. national stage of International Application Serial No. PCT/IB2019/060742, filed Dec. 13, 2019, and claims priority to Indian Patent Application No. 201841049073, filed Dec. 26, 2018. The entire disclosures of both of the foregoing applications are incorporated herein by reference.

TECHNICAL FIELD

The present disclosure in general relates to controllers and other non Time Sensitive Network (TSN) devices in industrial automation.

BACKGROUND

Industrial plants such as oil & gas plants, water plants, power plants, or paper & pulp plants, employ automation systems to monitor, protect and control plant assets. The automation network is a key element of such systems. Certain critical applications require critical messages to be exchanged between nodes with deterministic latency and reliability.

The distributed end node devices (e.g. controllers or I/O) need to exchange time critical messages with deterministic latency. Following the ongoing trend of IT/OT convergence, TSN is anticipated to be an important technology enabler, providing deterministic delivery of messages at device level. The technology is proposed to be future-proof for traditional fieldbuses, especially industrial Ethernet protocols.

However, to exploit the benefits of TSN technology in the industrial automation domain, the main challenges are: migration of traditional devices, such as controllers, IEDs, and I/O, which do not have TSN capability, and establishing suitable time synchronization in a traditional system deployment (a system with traditional devices) using the standard time sensitive network system. Traditional devices such as controllers, IEDs, and I/O are the typical examples of non-TSN aware nodes in Industrial automation systems. The system deployment makes use of different time synch technologies; however, TSN technology demands highly accurate PTP/1588 AS.Rev2 time synch to maintain the TSN system. It is not possible to establish TSN specified time synch capability in traditional devices.

The synchronization accuracy of legacy devices can be increased by adding hardware and software components to existing legacy controllers. Commercially, synchronization card solutions are widely available from FPGA vendors. However, the improvement in accuracy comes at a cost. The FPGA based hardware cards are typically very costly and if integrated with controllers, the overall cost of the solution increases. Another important aspect is the integration of the hardware card to the existing controller architecture. The integration calls for software and hardware changes to existing controller framework. Hence, the integration is cumbersome, requiring design changes, corresponding implementation, and system validation efforts.

TSN would simplify the configuration of large industrial networks, allowing for more automation when designing the network. It would ease system design efforts as a network is configured automatically based on the engineering data and verified for configuration correctness. However, to take full advantage of TSN, the migration of legacy industrial automation devices is vital.

Thus, there is a need to come up with an efficient, cost-effective, software-based synchronization method to synchronize non-TSN aware nodes with TSN aware nodes for deterministic delivery of time critical messages in industrial networks.

SUMMARY OF THE INVENTION

In aspects, the current invention discloses a controller configured to communicate over a network in a process plant. The network comprises one or more native TSN devices. The controller comprises one or more process applications for controlling one or more processes in the process plant, wherein the one or more process applications includes plurality of tags corresponding to one or more process variables of the one or more processes in the process plant, a software TSN agent for receiving and transmitting packets associated with the one or more process applications on the controller, wherein the software TSN agent is configured to segregate packets associated with the one or more process applications for processing the packets in at least one of a TSN communication mode and a non-TSN communication mode; and a first network interface dedicated for TSN communication and a second network interface dedicated for non-TSN communication. The software TSN agent is configured to receive tag configuration information of the plurality of tags from an engineering tool for determining tags configured for TSN enabled communication, and for determining QoS properties for TSN communication via the second interface.

In an embodiment, the software TSN agent segregates the packets from the one or more process applications, prior to transmission, based on determined tags for TSN enabled configuration. Additionally, upon receipt of a packet, the software TSN agent is configured to identify a packet type of the received packet using one or more identifiers in the packet, and process the packet based on the determined packet type, wherein the one or more identifiers are associated with tag configuration information of the plurality of tags.

In an embodiment, the controller further comprises a third network interface, wherein the third network interface is dedicated for time synchronisation using a native TSN device.

In another aspect, the current invention discloses a method for time synchronisation of a controller connected to a native TSN device. The method comprises sending a timing request message to native TSN device via the network interface, the timing request comprising a first timestamp indicative of time of the transmission of the timing request, receiving a timing response from the native TSN device via the network interface, wherein the timing response comprises a second timestamp indicative of the time of receipt of the timing request at the native TSN device and a third timestamp indicative of the time of transmission of the timing response from the native TSN device, generating a fourth timestamp upon the receipt of the timing response from the native TSN device, wherein the fourth timestamp is indicative of the time of receipt of the timing response, calculating a delay and offset, using the first, second, third and fourth timestamps; and correcting a clock using the offset value, synchronizing the controller with the native TSN device.

BRIEF DESCRIPTION OF ACCOMPANYING DRAWINGS

The features, aspects, and advantages of the present subject matter will be better understood with regard to the following description and accompanying figures. The use of the same reference number in different figures indicates similar or identical features and components.

DETAILED DESCRIPTION

In an embodiment, the present invention discloses an efficient, cost-effective, software based TSN agent to synchronize non TSN aware nodes with TSN aware nodes for deterministic delivery of time critical messages in industrial network. The TSN agent is a software TSN agent and is installed in legacy devices such as controllers. The controller additionally includes two network interfaces NIC1 and NIC2 (Network interface Cards). Thus, there is separate provision for TSN and non-TSN traffic (e.g. two ports) and TSN Configuration can be done through separate port. These aspects are further explained below.

It may be understood by a person skilled in the art that while the current invention has been described using a controller, other non TSN devices such as IEDs, and I/O devices, etc., may also be enabled for TSN communication as described herein.

Figure 1:
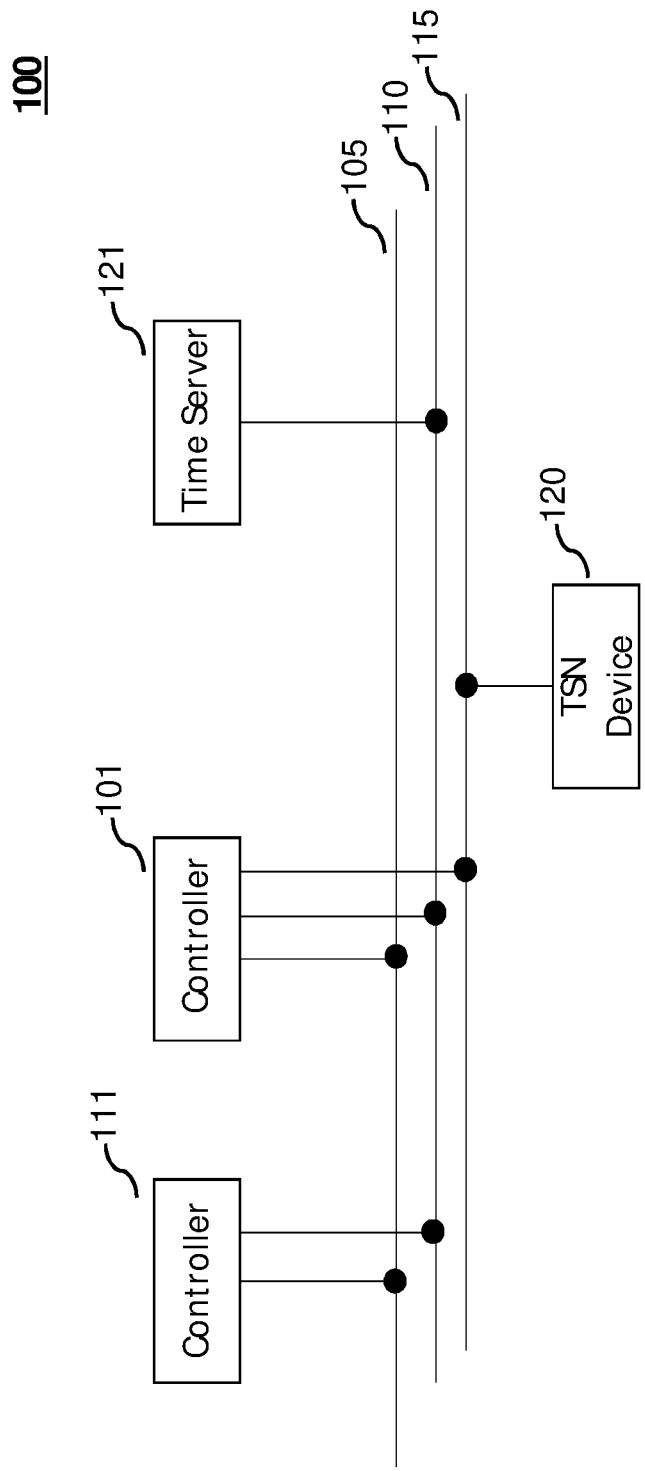
FIG. 1 illustrates a section of the control system, in accordance with the present embodiments of the current invention.

FIG. 1 illustrates a section 100 of a control system in a process plant. Section 100 includes a controller 111, controller 101. The controller 111 and controller 101 are connected over a control network 105. The controllers 111 and 101 are connected to one or more field devices and I/O modules. The one or more field devices includes sensors and actuators which are connected to industrial processes.

The controllers 101 and 111 include a plurality of process applications. The plurality of process applications control one or more processes in the process plant using the field devices. The process applications of the controllers receive measurements of the process variables of the corresponding process from the one or more sensors, and accordingly, operate the actuators for controlling the manipulated process variables of the industrial process. The process applications are configured on the controllers 101 and 111 by an engineering tool (not shown in FIG. 1). The engineering tool configures the process applications by creates the corresponding control logic in the controllers using tags of the process variables of the industrial processes to be controlled by the corresponding controller.

The section 100 additionally includes a NTP server 121. The NTP server 121 and the controllers 101 and 111 are connected over network 110. The controllers 101 and 111 utilize the NTP server 121 for synchronisation. In addition to being able to communicate with controller 111 over control network 105, the controller 101 is also able to communicate with a native TSN device 120 over a network 115. This is further explained in the description of FIG. 2.

Figure 2:
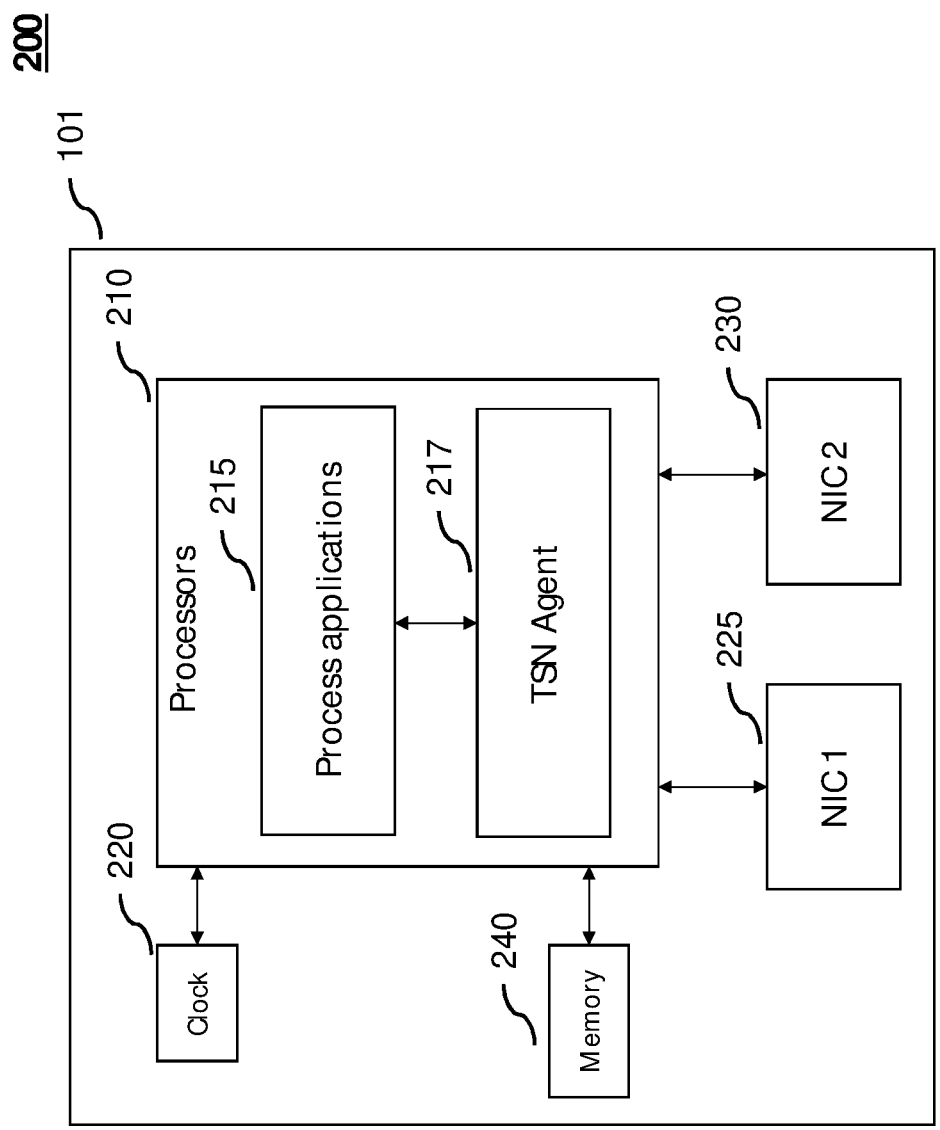
FIG. 2 illustrates a TSN enabled controller, in accordance with the present embodiments of the current invention.

FIG. 2 illustrates a block diagram 200 of the controller 101. The controller 101 includes one or more processors 210, a clock 220 and memory 240 connected to the processor 210. The controller 101 includes two or more network interfaces 225 and 230 (shown in the figure as NIC 1, and NIC 2).

The one or more processors 210 are programmed to execute the plurality of the process applications 215 for controlling the corresponding industrial processes using the connected field devices. In addition to the plurality of process applications 215, the one or more processors 210 include a software TSN agent 217. The software TSN agent 217 (also referred to as TSN agent) is responsible for handling (i.e. receiving and transmitting) communications in one of a TSN communication mode and a non-TSN communication mode. Additionally, the TSN agent 217 is responsible for configuration of the TSN policy, synchronisation of the clock for TSN communication, segmentation of network traffic into one of the two modes, and processing the traffic in accordance with the TSN policy. These aspects in relation to the software TSN agent are explained below.

Figure 3:
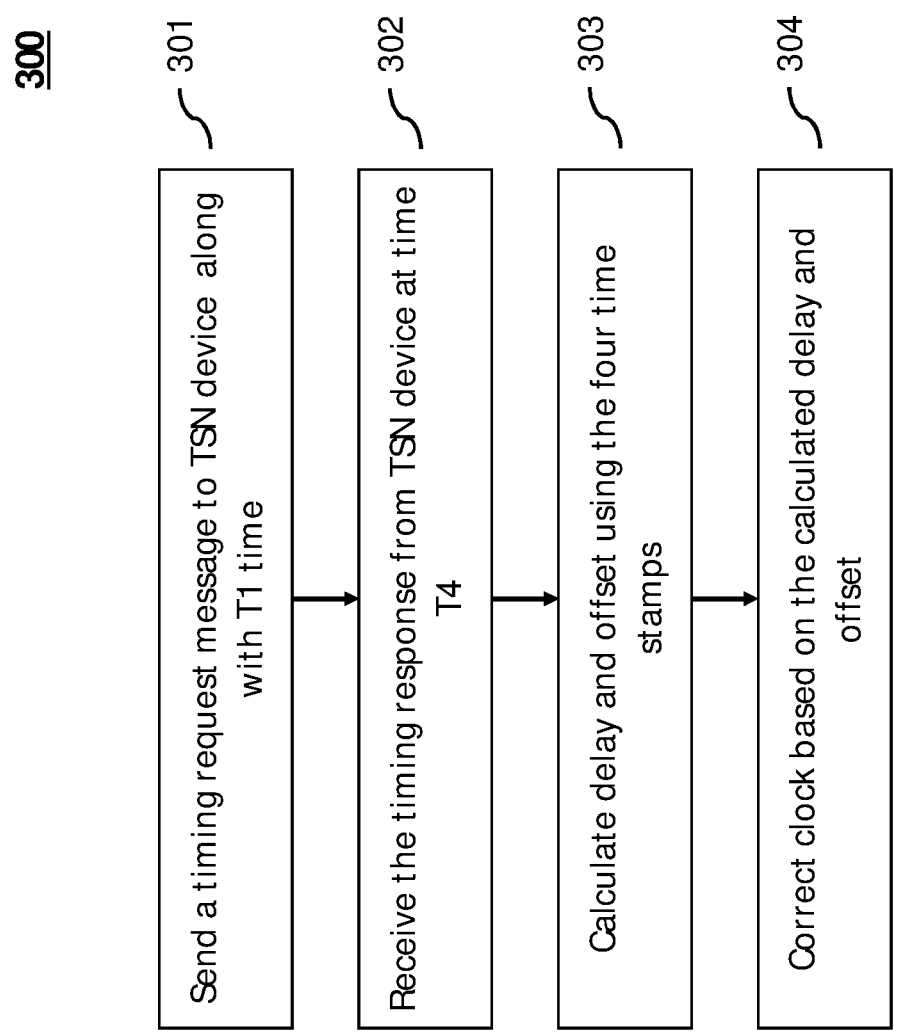
FIG. 3 illustrates a method of synchronisation, in accordance with the present embodiments of the current invention.

FIG. 3 illustrates a method of time synchronisation using the software TSN agent. The controller 101 may have a standard defined time synchronization, and or user defined time synchronization used in controller TSN communication or information flows. In an embodiment, the network interface (NIC 2) used for TSN information flows can also be used for time synchronization. In another configuration, there may be dedicated network interface for time synchronization (NIC 3, not shown in figures). The software TSN agent 217 utilises soft synchronisation techniques for synchronising the clock 220.

The soft synchronization method uses typical principle of network synchronization of exchanging the timestamps between nodes and calculating the offset for clock correction at client end. It uses software timestamping typically done at application layer as is the case with NTP, SNTP and most of existing synchronization methods in legacy automation devices. It does not require special hardware like FPGA which is used for hardware timestamping at layer 2 to improve the synchronization accuracy.

The controller 101 that hosts TSN agent acts as the client and synchronizes its clock to more accurate TSN device 120. The method 300 of synchronization includes following major steps. At T1, step 301, the controller 101 sends a timing request message to TSN device 120 along with T1 time. The TSN device 120 upon receiving timing request, registers its own time T2. At time T3, the TSN device 120 sends timing response to controller 101 with T1, T2 and T3. At step 302, The controller 101 upon receiving the timing response denotes its own time T4. Now the controller 101 has four timestamps T1, T2, T3 and T4. This process is repeated periodically (e.g. every 1 sec so that we have new values every 1 sec)

At step 303, the TSN software TSN agent utilises the four stamps to calculate the delay and offset:

$$\text{One-way delay } \hat{d} = \frac{T_4 - T_1}{2} - \frac{T_3 - T_2}{2}$$

$$\text{Offset } \hat{\theta}_C = \frac{1}{2}(T_1 - T_2) + \frac{1}{2}(T_4 - T_3)$$

The measured offset has several sources of errors, such as crystal oscillator drifts, variable queuing delays, delay due to software timestamping, variable network delays, etc. The combined variation in delay/offset introduced by the above sources affect the synchronization accuracy. The queuing delays are minimized using two separate network interfaces (NIC 2 and NIC 1) for TSN and non-TSN traffics respectively. In an embodiment, however, to reduce the overall variation in offset, Kalman Filters are utilised, to provide the estimates of frequency and time offsets. Instead of a Kalman filter, a person skilled in the art could also use other signal processing algorithms such as Median filters or statistical threshold-based methods. Such methods have shown great results to reduce the variation in offset.

At step 304, the clock 220 of the controller 101 is corrected using the offset value, as known in the state of the art. The entire method 300 is repeated at a particular frequency (e.g. every 1 sec) so that the time varying aspect is eliminated and the clock 220 is synchronized continuously. In addition to synchronisation with a TSN device 120, the software TSN agent handles the traffic to and from the controller in either one of a TSN communication mode and a non-TSN communication mode.

For transmission of data from the controller, the software TSN agent segments the data to be transmitted into the above mentioned two categories (TSN communication mode and non TSN communication mode). Upon being segregated for TSN communication, the TSN specific data is saved in special TSN frame and sent out. Upon being segregated for non-TSN communication, Non-TSN specific data is saved as normal frame and handled as known in the state of the art. In order to segregate the data to the transmitted, the software TSN agent utilises tag information as configured during engineering of the plant. This is explained below.

The engineering tool sets properties of the process tags (associated with process values) of the process applications during the engineering of the process plant, to associate time sensitive information. The software TSN agent on controller 101 on receiving the tag configuration information will identify the tags that corresponds to TSN and create a set of TSN specific tag lists. The software TSN agent will interface with the tag lists and generate the information flow using services such as interrupt service or poll service to transmit the TSN packets with QOS defined by the tag property. The tags whose property is configured with Non-TSN will have their own specific lists, and communication module will manage these information flows in co-existence with the TSN flows. In function blocks created for a specific application the tags will updated by the function block according to the application logic and tag property.

Upon receiving data on either the NIC 1 or NIC2, an interrupt is invoked using interrupt controller of the controller 101. The TSN agent upon receiving the intelTUpt, classifies the received data into TSN and non-TSN communication mode based on the TSN specific tag list. The TSN agent upon identifying the packet type using tag identifiers in the packet, will generate a queue identifier for each packet. Upon identifying the received packet to be a TSN packet, the TSN software TSN agent will update the received packet queue belonging to TSN packets, and further update the priority property of tag. Using priority property and received packet type or traffic class as specified in the TSN configuration associated with the tag during engineering, TSN agent initiates a read cycle to update the value of the process tag in the function block, and application logic of the corresponding process application. If the packet is received without tag identifiers of tags in the TSN specific tag list, then the software TSN agent will update the received packet queue belonging to non TSN communication, with the received packet.

In a typical scenario, the software TSN agent uses first network interface (NIC 1) transmit the data in TSN communication mode. Non-TSN communication mode is performed over the second network interface (NIC 2). This approach reduces the traffic congestion at the transmit port and greatly reduces the queuing delays. Having a dedicated interface to handle the TSN information flows to improves the desired system performance. A dedicated interface for TSN in a controller provides the desired modularity and information exchange performance. The controller shall have a function block to set the properties of the network interfaces to handle the information flows from the controller. The function block can be configured for TSN QOS, communication interlaces, tags priorities, etc., using the engineering tool.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

We claim:

1. A controller configured to communicate over a network in a process plant, wherein the network comprises one or more native time sensitive network (TSN) devices, the controller comprising:
    a) one or more process applications for controlling one or more processes in the process plant, wherein the one or more process applications includes a plurality of tags corresponding to one or more process variables of the one or more processes in the process plant;
    b) a software TSN agent for receiving and transmitting packets associated with the one or more process applications on the controller, wherein the software TSN agent is configured to segregate packets associated with the one or more process applications for processing the packets in at least one of a TSN communication mode and a non-TSN communication mode; and
    c) a first network interface dedicated for TSN communication and a second network interface dedicated for non-TSN communication wherein the software TSN agent is configured to receive tag configuration information of the plurality of tags from an engineering tool for determining tags configured for TSN enabled communication, and for determining quality of service (QoS) properties for TSN communication via the second interface.

2. The controller as claimed in claim 1, wherein the software TSN agent segregates the packets from the one or more process applications, prior to transmission, based on determined tags for TSN enabled configuration.

3. The controller as claimed in claim 1, wherein upon receipt of a packet, the software TSN agent is configured to:
    a) identify a packet type of the received packet using one or more identifiers in the packet,
    b) and process the packet based on the determined packet type, wherein the one or more identifiers are associated with tag configuration information of the plurality of tags.

4. The controller as claimed in claim 1, wherein the controller further comprises a third network interface, wherein the third network interface is dedicated for time synchronisation using a native TSN device.

5. A method for time synchronisation of a controller connected to a native TSN device, the controller comprising a software TSN and a network interface dedicated for time synchronisation, the method comprising:

a) sending a timing request message to the native TSN device via the network interface, the timing request comprising a first timestamp indicative of a time of a transmission of the timing request;
b) receiving a timing response from the native TSN device via the network interface, wherein the timing response comprises a second timestamp indicative of a time of receipt of the timing request at the native TSN device and a third timestamp indicative of a time of transmission of the timing response from the native TSN device;
c) generating a fourth timestamp upon the receipt of the timing response from the native TSN device, wherein the fourth timestamp is indicative of a time of receipt of the timing response;
d) calculating a delay and offset, using the first, second, third and fourth timestamps; and
e) correcting a clock using the offset value, synchronizing the controller with the native TSN device.

6. The method for time synchronisation of the controller connected to the native TSN device of claim 5, the controller comprising a second network interface for non TSN communication, the method further comprising:
f) handling, by the software TSN agent, a communication of the controller in a non TSN communication mode.

\* \* \* \* \*